United States Patent
Ribeiro

(10) Patent No.: US 12,234,095 B2
(45) Date of Patent: Feb. 25, 2025

(54) SET OF LINING PLATES MADE OF RADIAL TIRES AND A METHOD FOR MANUFACTURING LINING PLATES MADE OF RADIAL TIRES

(71) Applicant: RUBBERBRAS LTDA, Município de Itabira (BR)

(72) Inventor: Lucas Ribeiro, Nova Lima (BR)

(73) Assignee: RUBBERBRAS LTDA, Município de Itabira (BR)

( * ) Notice: Subject to any disclaimer, the term of this patent is extended or adjusted under 35 U.S.C. 154(b) by 475 days.

(21) Appl. No.: 17/601,386

(22) PCT Filed: Apr. 12, 2019

(86) PCT No.: PCT/BR2019/050135
§ 371 (c)(1),
(2) Date: Oct. 4, 2021

(87) PCT Pub. No.: WO2020/206516
PCT Pub. Date: Oct. 15, 2020

(65) Prior Publication Data
US 2022/0161526 A1    May 26, 2022

(51) Int. Cl.
*B65G 11/16*    (2006.01)
*B02C 17/22*    (2006.01)
(Continued)

(52) U.S. Cl.
CPC .......... *B65G 11/166* (2013.01); *B02C 17/225* (2013.01); *B32B 3/06* (2013.01);
(Continued)

(58) Field of Classification Search
CPC ... B32B 25/042; B32B 3/06; B32B 2307/554; B32B 2305/70; F16B 5/0012;
(Continued)

(56) References Cited

U.S. PATENT DOCUMENTS 2,024,439 A * 12/1935 Evans, Jr. ............... F04B 53/16
                                                        138/137
3,883,080 A *  5/1975 Andersson ............ B02C 17/225
                                                         241/182
(Continued)

FOREIGN PATENT DOCUMENTS

BR    MU8502304-3 U    5/2007
BR    0202363-6 B1    2/2012
(Continued)

OTHER PUBLICATIONS

"Radial Tire", 2003, Britannica, https://www.britannica.com/technology/radial-tire (Year: 2003).*
International Search Report issued in corresponding International Application No. BR2019/050135 dated Dec. 9, 2019.

*Primary Examiner* — Jasper Saberi
(74) *Attorney, Agent, or Firm* — ArentFox Schiff LLP

(57) ABSTRACT

Disclosed is a set of lining plates made of radial tires to protect pieces of equipment from abrasion and to absorb impacts where said set of lining plates comprises a plurality of lining plates made of radial tires that are laid out next to each other in order to line the surface of a given equipment. The lining plates that make up the set are fitted with tongues and grooves so as to allow them to be joined together and make it possible for a perfect fixation through special hook-type screws in order to secure an effective sealing of the equipment surface on which said plates were installed, thus preventing any material from entering the space between the lining plates. The present invention also relates to a method for manufacturing the lining plates of the set using radial tires.

9 Claims, 3 Drawing Sheets

(51) Int. Cl.
- *B32B 3/06* (2006.01)
- *B32B 25/04* (2006.01)
- *B32B 38/00* (2006.01)
- *B65D 90/04* (2006.01)
- *E21F 13/00* (2006.01)
- *F16B 5/00* (2006.01)
- *F16M 1/00* (2006.01)

(52) U.S. Cl.
CPC ........ *B32B 25/042* (2013.01); *B32B 38/0004* (2013.01); *B65D 90/043* (2013.01); *B65G 11/16* (2013.01); *E21F 13/00* (2013.01); *F16B 5/0012* (2013.01); *F16M 1/00* (2013.01); *B32B 38/0012* (2013.01); *B32B 2305/70* (2013.01); *B32B 2307/554* (2013.01); *B32B 2307/558* (2013.01); *B65G 2207/48* (2013.01); *Y10S 198/956* (2013.01); *Y10S 428/9088* (2013.01)

(58) Field of Classification Search
CPC ........ F16M 1/00; F16M 1/08; B60C 2200/14; B65G 2207/48; B65G 11/16; B65G 11/166; B02C 17/22; B02C 17/225; Y10S 198/956; Y10S 428/9088; B65D 90/043
See application file for complete search history.

(56) References Cited

U.S. PATENT DOCUMENTS

| | | | | |
|---|---|---|---|---|
| 4,120,605 | A | * | 10/1978 | Hurst ........................ E02F 3/90 415/197 |
| 5,096,772 | A | * | 3/1992 | Snyder .................. B29C 70/202 428/903.3 |
| 5,340,630 | A | * | 8/1994 | Tripp ........................ E04C 3/28 156/95 |
| 5,834,083 | A | | 11/1998 | Pignataro, Jr. |
| 6,372,069 | B1 | | 4/2002 | Walls |
| 6,527,891 | B2 | * | 3/2003 | Khadem ............. B29B 17/0036 156/95 |
| 2001/0032695 | A1 | * | 10/2001 | Coffin ................ B32B 38/1808 156/123 |
| 2003/0010421 | A1 | * | 1/2003 | Coffin .................... B29C 53/18 156/95 |
| 2014/0097062 | A1 | * | 4/2014 | Berroth .................. B65G 11/16 193/2 R |
| 2016/0303574 | A1 | * | 10/2016 | Chen ...................... B02C 17/22 |

FOREIGN PATENT DOCUMENTS

| | | |
|---|---|---|
| ES | 2352026 A1 | 2/2011 |
| WO | 2014013487 A1 | 1/2014 |

\* cited by examiner

SET OF LINING PLATES MADE OF RADIAL TIRES AND A METHOD FOR MANUFACTURING LINING PLATES MADE OF RADIAL TIRES

This application is a 35 U.S.C. § 371 National Phase of PCT Application No. PCT/BR2019/050135, filed on Apr. 12, 2019, which is hereby incorporated by reference herein.

FIELD OF INVENTION

The present invention relates to a set of lining plates made of radial tires comprising a plurality of lining plates obtained by means of radial tire cuts from off-road trucks. The present invention also relates to a method for manufacturing lining plates made of radial tires that make up the set.

PRIOR ART TO THE INVENTION

Lining plates comprise plates used to protect pieces of equipment and surfaces subject to abrasion. Said plates are widely used in mining-related processes, such as conveyors, screens, crushers and others due to the great abrasion present in the materials applied in these processes.

In the state of the art, lining plates are often made of metallic material such as cast iron or manganese steel, thereby ensuring longer service life to the surface or equipment to which the lining plates are applied.

However, these metal lining plates have a useful life significantly reduced, which requires frequent and thorough replacement of the set of lining plates, in which case it's necessary to shut down the equipment to perform this replacement, thereby making the equipment inoperative and unproductive throughout the replacement process.

Additionally, state-of-the-art metal lining plates present a high level of noise during the operation of the equipment in which they are installed, due to the impact of the material inside the equipment with the metal plates.

The manufacturing cost of said state-of-the-art metal plates is very high, which adds to their costly replacement, in addition to the fact that these plates often disengage from the equipment to which they were installed, thereby generating losses due to the damage they cause to the equipment when they disengage.

The state of the art also presents rubber lining plates made of radial tires which, as implied by their name, are made of rubber taken from large-size radial tires used in off-road trucks.

Document PI 0202363-6, titled "Process for obtaining an anti-abrasion lining plate and lining plate" describes a process for the manufacturing of plates in which said plates made of radial tires show a square or rectangular shape with smoothed sides, comprising through holes distributed over the area of the plate to enable the fixation of the plates to the equipment by means of screws.

However, given that their sides have been smoothed, when the plates are fixed next to each other on the equipment or surface to be protected, the ensuing set of lining plates doesn't provide for an effective sealing as the plates are only placed against each other to form the lining.

Given the absence of no effective sealing, materials that are loaded onto the equipment to which the lining plates are installed get into the spaces between the lining plates thereby damaging the equipment and making for early wear of said equipment.

Document MU 8502304-3, titled "Rubber wear plate made of used tires", shows a description of abrasion-resistant wear plates that are cut out of the tread or any other possible part of any type of used tires so that they can be used in any place where wear is detected due to abrasion and where these plates made of tires can be suitably used. According to document MU 8502304, these plates are provided with a recess to accommodate the fixation screw's head and a locking system comprising a thrust washer and a limiting tube.

However, given that the plates have straight sides and, therefore, show the same problems cited in the aforementioned document PI 0202363-6 due to the fact that they are installed next to each other on the equipment or surface to be protected, the ensuing set of lining plates doesn't provide for effective sealing, in which case materials loaded onto the equipment can get into the spaces between the plates, thereby damaging the equipment and making for early wear of said equipment.

That being the case, there's no set of lining plates made of radial tires in the state of the art that provides for effective sealing between the plates that make up the lining of the equipment's surface in order to prevent materials from getting into the spaces between plates.

Additionally, the state of the art includes no step during the manufacturing of lining plates made of radial tires for the provision of grooves and tongues made on each plate so as to allow them to fit each other in order to provide for an effective sealing of the equipment on which they are installed. This type of fitting also refers to the application in places of strong impact, given that joining the plates through these grooves and tongues allow for the installation of the plates in places subject to strong impacts and great abrasion, without losing their effectiveness.

OBJECT OF THE INVENTION

The present invention aims at providing a set of lining plates made of radial tires fitted with an effective and safe sealing in order to prevent any material from getting into the spaces between the lining plates that make up the set.

The present invention also aims at providing for a method of manufacturing lining plates made of radial tires fitted with grooves and tongues so that they can be joined together in a way as to ensure an effective sealing of the equipment on which they are installed.

Another object of the present invention is to allow for such plates to be applied to places of strong impact using grooves and tongues that allow for two overlapping plates to form a single piece, in addition to making it possible to be largely used in places of strong impact and great abrasion.

The present invention also stands out in the way the plates are attached, since hook-type screws are used to fix the plates on the equipment. This type of fixation prevents the ore from having any contact with the equipment, in addition to providing for a firm attachment of the plates on the equipment as the hook-type screws are fixed to the wire rope meshes of the lining plates.

BRIEF DESCRIPTION OF FIGURES

The present invention is described in detail based on the following figures.

SUMMARY OF THE INVENTION

Figure 1:
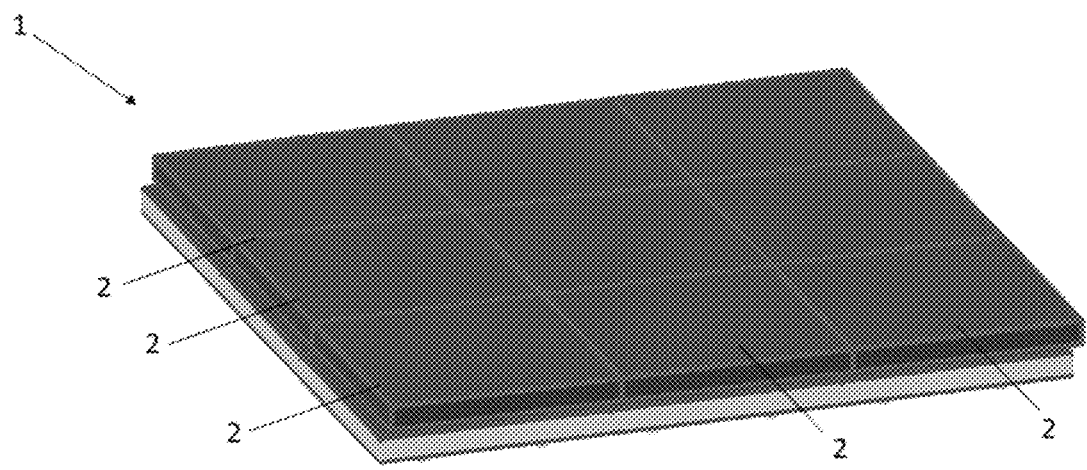
FIG. 1 illustrates a perspective view of the set of lining plates made of radial tires.

In a preferred embodiment, the present invention relates to a set of lining plates made of radial tires comprising a plurality of lining plates laid out next to each other, covering a given surface of an equipment in which the lining plate (2) made of radial tires shows a rectangular shape, four sides (4); tongues and grooves (3); two sides (5' and 5"), and a plurality of hook-type screws (7).

Another object of the present invention is to provide a method for manufacturing lining plates made of radial tires comprising he following steps:

i. receiving a plurality of radial tires, assessing and sorting them according to size and wear;

ii. cutting each radial tire, splitting it into two parts, namely, the tread and the sides of the radial tire;

iii. making longitudinal cuts on the radial tire tread in order to obtain four-sided plates;

iv. laminating the plates obtained in step iii to standardize plate thickness;

v. cutting tongues and grooves on the four sides of the plate;

vi. pressing a hook-type screw through the plate to fix it to the wire rope mesh;

vii. sanding all the surfaces of the lining plate; and viii. applying a thin layer of a black liquid to the surface of the lining plate.

DETAILED DESCRIPTION OF THE INVENTION

Although the present invention may be liable to different modalities, the drawings and the detailed description that follows show a preferred embodiment with the understanding that the present description should be considered as an example of the principles of the invention and as such isn't intended to limit the present invention to what has been illustrated and described herein.

The main approach of this invention relates to a set (1) of lining plates (2) made of radial tires to be used as an effective lining for pieces of equipment and surfaces subject to impact and abrasion, in order to prevent materials loaded onto these pieces of equipment from getting into direct contact with the equipment.

The set (1) of lining plates (2) made of radial tires comprises a plurality of lining plates (2) attached to each other to form the set (1), thereby providing a lining for the equipment to which these plates are attached (see FIG. 1).

The above mentioned lining plates (2) are manufactured by cutting and splitting the tread of off-road trucks radial tires, thus allowing for the reuse of these huge tires.

That way, the lining plates (2) used in the set (1) of the present invention also contribute greatly to the environment by recycling 100% of a raw material that is difficult to be recycled, that is to say, radial tire scraps from off-the-road trucks.

The lining plates (2) made of radial tires preferably comprise a rectangular four-sided shape (4), said sides being perpendicular to each other, and two sides (5' and 5") parallel to each other and perpendicularly laid out in relation to the sides (4).

Side 5' is smooth, while side 5" is rough, with side 5" being fitted with grooves and tongues comprised by the tread of the radial tire from which the lining plate (2) is cut off.

Thus, in a preferred embodiment for fixation, side 5" is laid out in such a way as to get in contact with the equipment, while side 5' gets in contact with the abrasive material that is moved by the equipment.

Figure 2:
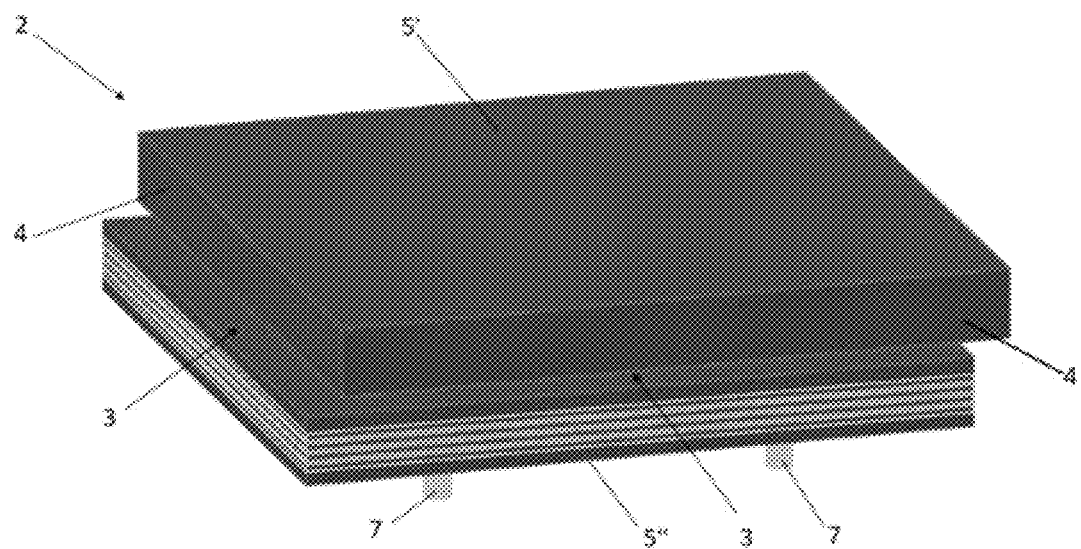
FIG. 2 illustrates a perspective view of a lining plate made of radial tires.
Figure 3:
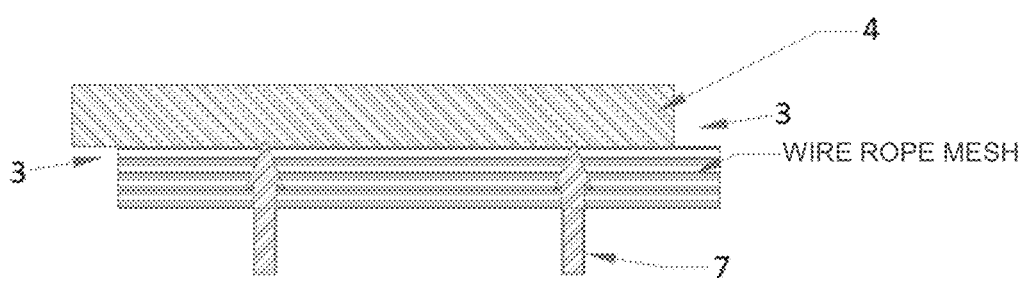
FIG. 3 illustrates a side view of the lining plate made of radial tires.
Figure 4:
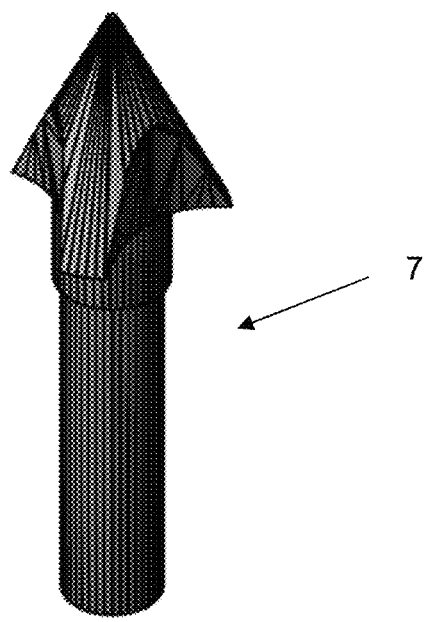
FIG. 4 shows a hook-type screw.

The lining plates (2) of the set (1) also comprise hook-type screws (7), as illustrated in FIG. 4, with which said plates are attached to the equipment as can be seen in FIGS. 2 and 4, and where the screws (7) are fixed to the wire rope mesh of the lining plates (2).

The method for fixing the lining plate (2) on the surface of pieces of equipment often comprises a set of plates with a tongue and groove profile, as well as hook-type screws (7) for fixation on the equipment, with said plates being assembled and positioned next to each other to form the set (1) of lining plates (2) (see FIG. 1).

No through hole on the plate (2) is required for the screw (7) to be fixed, thereby avoiding the creation of cracks on the upper part of the plate and the accumulation of residues. Furthermore, given that the screw head (7) is not visible on the surface 5", it's not kept exposed to the outside area of the set (1). Therefore, should the lining plate (2) be subject to impact or abrasion, the screw head will be protected by a layer of rubber, thus increasing the service life of both the screw (7) and lining plates (2).

Each lining plate (2) of the set (1) is fitted with tongues and grooves (3) on at least two of the four sides (4) in order to allow for joining the lining plates (2) together.

Given that the lining plates (2) of the set (1) are provided with grooves and tongues (3) for fitting them together, no material loaded onto the equipment on which the set (1) is installed can enter the spaces between the lining plates (2) to damage the equipment.

This kind of joint comprises a tongue on one side (4) of a plate and a groove on one side (4) of the opposite plate so that when both lining plates (2) are forced against each other, the tongue of one lining plate (2) fits into the groove of the other lining plate (2). In a preferred embodiment, each lining plate (2) is fitted with two tongues on opposite sides and two recesses on the other two sides, and the lining plates (2) are laid out in such a way that the tongue of one lining plate (2) faces the groove of the other lining plate (see FIG. 2). However, in cases where the process involves coarse grain material, a different embodiment may be used in which each lining plate (2) is fitted with only one tongue (3) and one groove (3) on opposite sides (4) so that the plates (2) will be joined by two sides only.

Therefore, an equipment fitted with a set (1) of lining plates (2) and provided with hook-type screws (7) and four fittings (3) is protected against any external impact and abrasion. Furthermore, given that the equipment is provided with four fittings (3), no material can enter into the joints regardless of the direction of the flow of such material.

Figure 5:
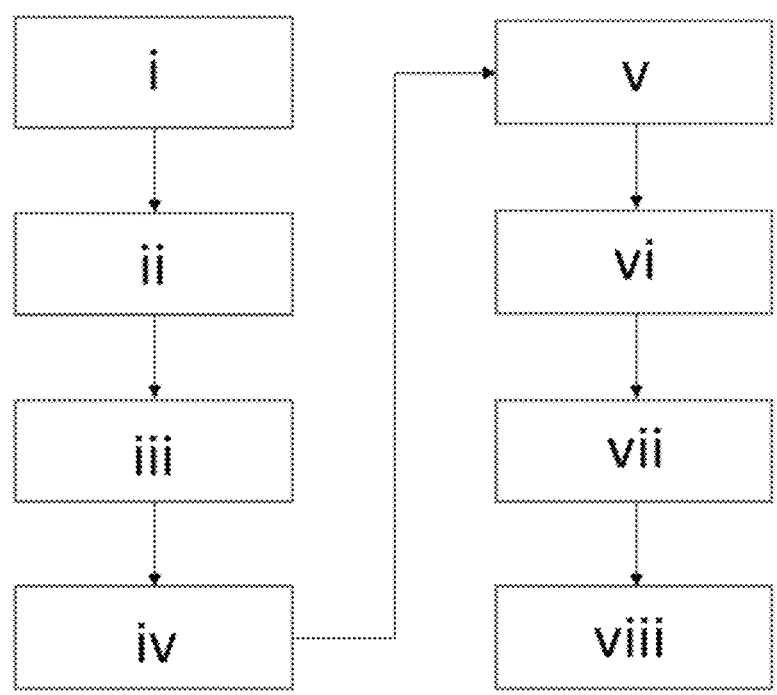
FIG. 5 illustrates a flowchart of the steps involved in the method for manufacturing the lining plates that make up the set of lining plates made of radial tires.

Now that the set (1) of lining plates (2) made of radial tires has been fully described, we'll proceed to the description of the steps involved in the method for manufacturing the lining plates (2) comprising the set (1) (see FIG. 5).

Another preferred embodiment of the present invention relates to a method for manufacturing lining plates (2) made of radial tires, comprising the following steps:

i. receiving a plurality of radial tires that will be assessed and sorted based on size and wear;

ii. cutting each radial tire and splitting them into two parts, namely, tread and sides;

iii. performing a longitudinal cut on the tread of the radial tire to obtain four-sided plates;

iv. laminating the plates obtained in step iii to standardize plate thickness;

v. providing fittings (3) on the four sides (4) of each lining plate;

vi. pressing a hook-type screw into the plate to fix it to the wire rope mesh;

vii. sanding all the surfaces of the lining plates (2); and viii. applying a thin liquid black layer on the surface of the lining plate.

Step i. comprises the delivery of off-the-road trucks radial tires, using special articulated trucks for the transportation and forklifts for unloading the tires. These radial tires are then assessed, stacked, and sorted according to size and wear.

Step ii. refers to the process of cutting the radial tire, which is the first step to initiate the manufacture of the set (1) of lining plates (2), whose size and design are controlled and defined as per the application needs. That is to say, a set (1) of lining plates (2) for a transfer chute is not the same as a set of lining plates for a crusher.

The cutting in step ii. is divided into two specific cuts both of which being made using the same machine. The purpose of these cuts is to sever the tire tread from its sides.

Only the radial tire treads that make up the set (1) of lining plates (2) are used in manufacturing the lining plates (2), and given that the tire sides are not the focus of the present invention, their ultimate disposal and reuse are not considered in detail herein.

Step iii. marks the beginning of the process involving the radial tire tread which is taken to a machine devised by the author of the present invention where a number of longitudinal cuts are carried out, which are known as cutouts, in order to shape the sides (4) of the lining plates (2).

Step iv. involves the lamination of the cut out plates obtained in the previous step, aimed at standardizing their thickness depending on how the set (1) of lining plates (2) is going to be applied.

As soon as the plates are cut out and a uniform thickness is secured, step v. is initiated in order to perform the fittings (3) on at least two sides of the lining plates (2) that comprise the set (1). Step v. is carried out by a cutting machine devised by the author of the present invention, which preferably makes eight cuts on the plates to allow for them to be joined together.

After the joining cuts (3) are made on the lining plates (2), step vi. is initiated and special hook-type screws (7) are then forced into the plates.

Upon completion of the steps during which hook-type screws (7) are forced into the plates, step vii. is then initiated whereby all the sides of the plates undergo a mechanized sanding procedure (finishing) through which their surfaces are polished to facilitate adhesion to the equipment intended for lining and also to make it easy for the tongue of each plate to be forced against the groove of the other plate.

Following the end of the finishing process by means of the mechanized sanding, the last step for manufacturing the lining plates (2)—step viii.—is then initiated in order to provide the lining plates (2) with a final touch by painting them with a thin black layer.

So, having described both the set (1) of lining plates (2) made of radial tires and the method for manufacturing the lining plates (2) that make up said set (1), it is clear that the use of the set (1) of lining plates (2) provides for the protection and a safe sealing of the pieces of equipment on which this set (1) is installed.

Said protection and sealing is achieved by the grooves and tongues (3) in the lining plates (2) that make up the set (1), thus preventing abrasive materials loaded onto the equipment from entering the spaces between these lining plates (2) and damaging the equipment.

Having described some preferred examples of embodiment of the present invention, it's worth pointing out that the scope of protection provided by the present document encompasses all other feasible alternative forms for the execution of this invention as defined and limited only by the content of the claims below.

In view of the above, although only a few examples of the present invention have been shown, it shall be understood that various omissions, substitutions and modifications can be made by a subject-mater expert without deviating from the spirit and scope of the present invention. The examples described herein shall in all aspects be considered only as illustrative and not restrictive.

It is expressly hereby provided for that all combinations of the elements that perform the same function in substantially the same way to achieve the same results make part of the scope of the invention. The replacement of elements from a described example with those of another is also fully intended and provided for.

It should also be understood that the drawings are not necessarily to scale as they are only of a conceptual nature. Therefore, the intention herein is to be limited as indicated by the scope of the appended claims.

The invention claimed is:

1. A set of lining plates made of off-road truck radial tires, comprising:
   a plurality of lining plates laid out next to each other configured for lining a surface of a given equipment;
   wherein each lining plate made of off-road truck radial tires has a rectangular shape, four sides, tongues and grooves, a first face and a second face, and a plurality of hook-type screws.

2. The set of lining plates made of off-road truck radial tires as per claim 1, wherein the tongues and grooves are located on the four sides of the plates.

3. The set of lining plates made of off-road truck radial tires as per claim 1, wherein the tongues and grooves are located on two opposite ones of the four sides.

4. The set of lining plates made of off-road truck radial tires as per claim 1, wherein the first face is configured to contact an abrasive material loaded onto the equipment.

5. The set of lining plates made of off-road truck radial tires as per claim 1, wherein the plurality of screws are positioned on a wire rope mesh of each lining plates made of off-road truck radial tires.

6. The set of lining plates made of off-road truck radial tires as per claim 4, wherein the first face is smooth and the second face is rough, wherein the tongues and grooves are located on the four sides of the plates.

7. A method for manufacturing lining plates made of off-road truck radial tires as per claim 1, comprising:
   i. receiving a plurality of off-road truck radial tires, assessing and sorting the plurality of radial tires according to size and wear;
   ii. cutting each radial tire of the plurality of radial tires, splitting each radial tire into two parts, namely, a tread and sides of the radial tire;
   iii. making longitudinal cuts on each tread to form respective lining plates;
   iv. laminating the lining plates obtained in step iii;
   V. cutting tongues and grooves on the four sides of each of the lining plates;

vi. pressing a screw through each plate to fix the screw to a wire rope mesh of each lining plate;
vii. sanding all surfaces of each lining plate; and
viii. applying a thin liquid black layer to a surface of each lining plate.

8. The method for manufacturing lining plates using off-road truck radial tires as per claim 7, wherein the tongues and grooves are of a male-female type.

9. The method for manufacturing lining plates using off-road truck radial tires as per claim 7, the screw is a hook-type screw.

* * * * *